United States Patent [19]
Gallacher

[11] 3,993,270
[45] Nov. 23, 1976

[54] SLIPPERY WHEEL DETECTOR

[75] Inventor: Bernard G. Gallacher, San Francisco, Calif.

[73] Assignee: Southern Pacific Transportation Company, San Francisco, Calif.

[22] Filed: July 16, 1975

[21] Appl. No.: 596,462

[52] U.S. Cl. .................................. 246/182 A; 73/8; 73/9; 104/26 A
[51] Int. Cl.² ...................... B61L 13/02; B61K 7/04
[58] Field of Search .......... 73/8, 9; 104/26 R, 26 A; 246/182 A, 182 BH; 340/267 R, 421; 244/110 R, 110 F, 110 G, 111; 303/21 P, 21 A, 21 CH; 188/181 A, 181 T

[56] References Cited
UNITED STATES PATENTS

| | | | |
|---|---|---|---|
| 3,033,018 | 5/1962 | Haggadone | 73/9 |
| 3,237,007 | 2/1966 | Crawford | 246/182 A |
| 3,317,164 | 5/1967 | Marcheron | 303/21 P X |
| 3,609,350 | 9/1971 | Wilson et al. | 246/182 A |

*Primary Examiner*—Stephen G. Kunin
*Attorney, Agent, or Firm*—Lindenberg, Freilich, Wasserman, Rosen & Fernandez

[57] ABSTRACT

This invention relates to a method and apparatus for determining whether or not a freight car in a classification yard can be adequately retarded, prior to it being moved to make up a freight train, by measuring whether the wheels of the freight car are too slippery for the car to be properly retarded to a safe speed while being moved toward the freight train.

12 Claims, 6 Drawing Figures

SLIPPERY WHEEL DETECTOR

BACKGROUND OF THE INVENTION

This invention relates to a method and means for detecting whether or not the wheels of a freight car are too slippery for the car to be adequately retarded by retarders while being rolled to a location where it will couple with other freight cars.

In gravity classification yards, a freight car is pushed by a locomotive to the top of a small hill, called a hump, and then is allowed to roll down under the influence of gravity. There are a large number of branching tracks from the track which runs down the hump and the freight car is directed into one of these branches as determined by the location of a freight train which is being made up and which will be going to the destination of the cargo in the particular freight car.

The velocity which the freight car attains, coming down the hump, must be controlled. If it is too small, the freight car will not be able to reach the location of the partially made up freight train. If it is too large, the freight car will smash into the partially made up freight train, thereby causing damage either to the freight car or to the cargo which it carries.

Retardation of freight cars in gravity classification yards is dependent upon the proper frictional coefficient produced by contact between the retarder shoes which are in the retarders which are used to control the freight car velocity, and the sides of the wheel flanges on a car being retarded. If any foreign matter accumulates on the wheels flanges or the retarder shoes, which effecitvely decreases the frictional coefficient, the possibility of an inadequate retarding effect is presented.

In order to prevent crashes of the type described, a device is required which can determine whether or not the wheels of a freight car or the retarder shoes are so slippery that the car will not be adequately retarded, prior to the freight car being pushed over the hump of a gravity classification yard. Such a device could certainly reduce the number of expensive crashes.

OBJECTS AND SUMMARY OF THE INVENTION

It is an object of this invention to provide a method and means for determining whether or not the wheels of a freight car or the retarder shoes are too slippery for the car to be adequately retarded by the retarders used in gravity classification yards.

Another object of this invention is to provide a novel method and means to measure the frictional characteristics of a freight car wheel rim or retarder shoes and to determine whether these are below a safe limit.

The foregoing and other objects of the invention are achieved by placing a retarder on the track of a gravity classification yard at a location before the freight car reaches the crest of the hump. This retarder is instrumented so that it can measure the forces which are applied to it when a freight car wheel is passing through it. The retarder basically comprises two shoes on opposite sides of a rail, which are spring or power biased toward one another. A pneumatic or hydraulic cylinder may also be used instead of springs. When a freight car wheel passes therethrough, the shoes press against the freight car wheel rims to apply the retarding forces. As a result of the frictional contact between these shoes and the rim, the shoes will have applied thereto forces opposite to the direction of motion of the freight car, a turning moment as well as a force normal to the plane of the shoes. Measurement of one or more of these forces can provide an indication of the frictional characteristics of the wheel rim and retarder shoes. Comparison of the measured force or forces with a previously established norm can be used to determine whether or not an alarm should be given in order that the freight car may be detoured away from the crest of the hump or handled down the hump by a locomotive. Also, as an indication of the effectiveness of the retarders, relative car retardation by the retarder can be measured using accelerometers, and this can be used to determine the advisability of allowing the car to continue further unguarded movement.

DESCRIPTION OF THE EMBODIMENTS OF THE INVENTION

Figure 1:
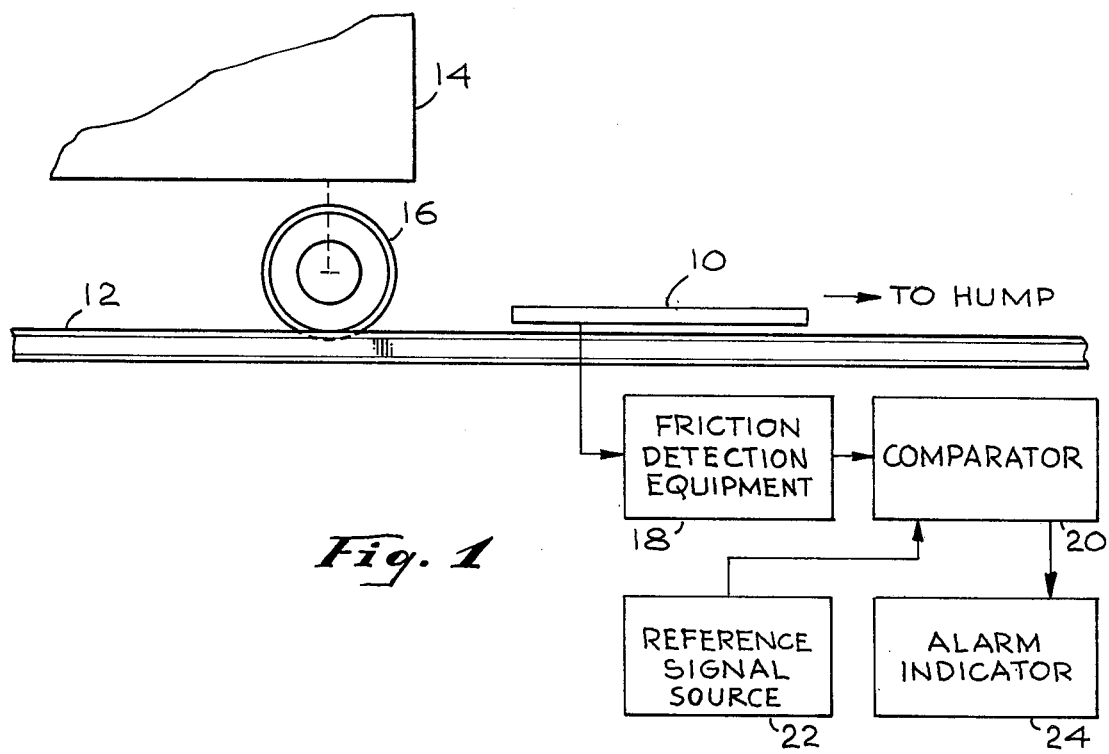
FIG. 1 is a schematic overview of an embodiment of the invention.

Referring now to FIG. 1, in accordance with this invention, a retarder 10, is placed on the track 12, before the hump in the gravity classificatin yard. This is by way of illustration of the location of the embodiment of this invention. It may be placed elsewhere, such as on an inbound yard lead or other location without departing from the spirit and scope of this invention. A freight car 14, is pushed toward the hump by a locomotive. The freight car is uncoupled at the hump and continues rolling under the influence of gravity. The wheel 16 of the freight car rolls between the two shoes of the retarder 10 which applies a predetermined pressure against these two shoes. Because of the forces of friction, the moving wheel will tend both to move the retarder shoes in a direction of the motion of the freight car, to apply a pivoting moment to the shoes, and also to apply a force normal to the plane of the shoes. These forces are resisted, of course, by the retarder. However, the measurement of one or both of these forces can be used to indicate the frictional status, or "slipperiness" of the wheel, since the slipperier the wheel, for a given "squeeze" force, the lower the rotational moment and the lower the linear force applied in the direction of the motion of the car.

Sensors are applied to the retarder to detect these forces, and the nature of these sensors will be described in more detail hereafter. The sensor employed will provide an electrical signal output. The sensors and their associated circuits are represented in FIG. 1 by the rectangle designated as friction detection equipment 18. The electrical signals generated by the friction detection equipment 18, are applied to comparator 20. There the signals are compared with reference signals from the source 22. If these signals do not equal or exceed the reference signals, the comparator provides an output signal indicative of this, which is applied to an alarm indicator 24. The alarm indicator notifies the railroad yard crew whereby they can take the proper action to shunt the freight car with the slippery wheel to another track in order to take whatever precautions are needed so that it will be retarded properly on its way to the freight car to which it is to be coupled, or will handle the car down the hump under control of a locomotive, rather than allow the car to roll under the influence of gravity.

Figure 2:
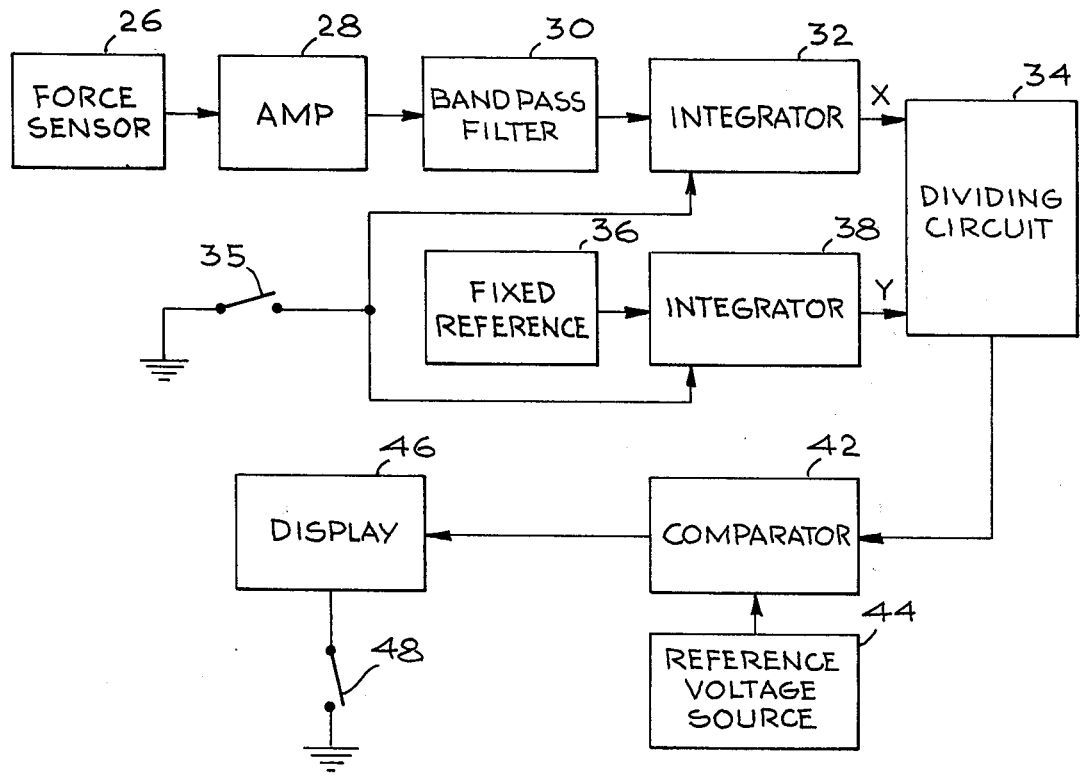
FIG. 2 is a block schematic view of the electronics circuits which may be employed with this invention.

FIG. 2 is a schematic diagram in more detail of the electronic circuitry, exemplary of that which may be required with this invention. The force sensor 26, which may be a load cell, or an accelerometer, or strain gauges, which are mounted on the retarder 10, are connected to an amplifier 28. The amplifier output is connected to a band pass filter, 30, the band pass filter output is applied in an integrator 32, whose output is one input, (X), to a dividing circuit 34, (2=x/4). The integrator 32 is reset and enabled to operate by the actuation of the switch 35, which is operated when a wheel enters the retarder 10. A fixed reference voltage source 36, applies a reference voltage to an integrator 38, whose output (Y) is applied to the dividing circuit 34. The switch 35, when operated also resets the integrator 38. Accordingly, the output of the dividing circuit is both proportional to the time a wheel is in the retarder and provides an indication of the force measured by the transducer 26.

A comparator 42, compares the output of the dividing circuit with output from a reference voltage source, 44. The result of the comparison is applied to a suitable display device 46, which is actuated by operation of a switch 48. Switch 48 is momentarily closed when the wheel of a car leaves the retarder. The shoes of the retarder are spring or power biased toward one another and when the wheel 16 comes between them, they are moved outwardly. The switches 35 and 48 are positioned adjacent to the track so that they are respectively actuated, when the wheel of a freight car enters the retarder, and when it leaves the retarder.

When a wheel comes between the retarder shoes, the force sensor produces an output signal representative of the frictional state of the wheel rims, the signal is amplified by amplifier 28 and then passed through band pass filter 30 which eliminates any noise signals which may occur. The output of the band pass filter is integrated by integrator 32 while the wheel is passing through the retarder. The integrator output is then applied to the dividing circuit which divides it by a voltage from integrator 38 thereby taking into consideration the time required for the wheel to pass through the retarder. The output of the divider is then compared with a reference voltage from source 44. The output of the comparator is applied to the display device 46 after the interval required for the integrator to receive all of the signals to be integrated.

The circuits designated in the schematic diagram of FIG. 2 are all well known to those skilled in the art as well as the manner and means of connecting them together and causing them to operate properly. Accordingly, a detailed description of these circuits will not be given here.

Figure 3:
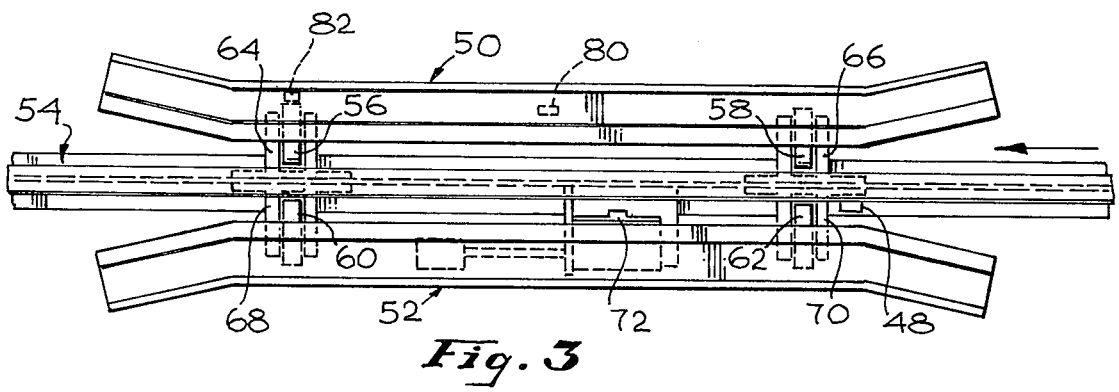
FIG. 3 is a view in elevation of a retarder and instruments which constitute an embodiment of the invention.

FIG. 3 is a view in elevation of the retarder illustrating also the placement thereon of two different transducers which may be employed to sense the slipperiness of the wheel, in accordance with this invention and the switch 40. The retarder essentially comprises two shoes respectively 50, 52, which are mounted on opposite sides of a section of track 54. They are supported adjacent the track by four levers respectively 56, 58, 60, 62, which are pivotally mounted in support castings respectively 64, 66, 68, 70. The support castings are bolted to the rail seciton 54.

Figure 4:
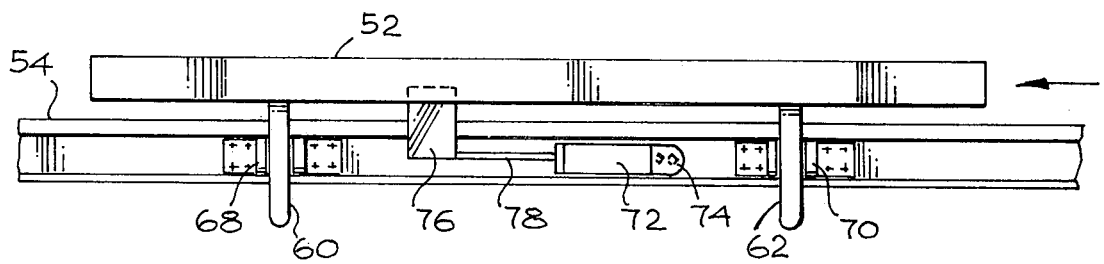
FIG. 4 is a schematic view in elevation representing the embodiment shown in FIG. 3.

In accordance with one embodiment of this invention, a sensor comprising a load cell 72, is employed for sensing the forces being applied to the retarder in the direction of motion of the freight car as the freight car wheel is passing through the retarder. Reference is also made to FIG. 4, which is a schematic plan view of the retarder and load cell. The load cell is a well known and commercially purchaseable device which is used to measure a tension or a compression load and to provide an output signal representative thereof. As shown in FIGS. 3 and 4, the load cell 72 will be attached by suitable means, such as a clamp 74, to the rail 54. A protuberance 76 will be welded to the shoe 52 and a coupling member 78 will extend between the protuberance 76 and the sensing end of the load cell 72.

As is better seen in FIG. 4, the retarder shoes are supported by the lever arms. Accordingly, when the wheel of a freight car moves between the retarder shoes, which grip the rims of the wheel, a back force is applied to the retarder shoes which is determined by the pressure applied by them to the wheel as well as the state of the wheel rim and retarder shoes, that is how slippery they are at the time. The pressure applied by the retarder shoes is maintained constant, accordingly, the forces tending to move the retarder shoes in the direction of motion of the freight car are determined substantially by the state of slipperiness of the wheel rims and retarder shoes, or alternatively stated by their frictional state. Accordingly, the tensional forces applied to the load cell by the retarder shoe, as the wheel moves therethrough, can be used as a measure of how slippery the wheel is. Electrical output of the load cell is applied to the amplifier 28, shown in FIG. 2.

Another arrangement for measuring the slipperiness of the wheel of a car passing through the retarder is also represented in FIG. 3. One or more accelerometers, 80, 82, may be mounted on one of the retarder shoes in order to measure the frictional state of the wheel which is passing through the retarder. When the wheel of the freight car enters between the retarder shoes, it causes the retarder shoes to move in the direction of motion of the freight car and to oscillate. The oscillation of the retarder shoes caused as a result of gripping the freight car wheel, is in substantially direct response to the frictional state of the rim of the wheel. By measuring the acceleration which the retarder shoe undergoes in response to a wheel which is just acceptable, and by maintaining the pressure attempted to be applied by the retarder shoe to all subsequent freight car wheels substantially the same, one may establish a reference signal indicative of the minimal acceleration which is acceptable.

Figure 5:
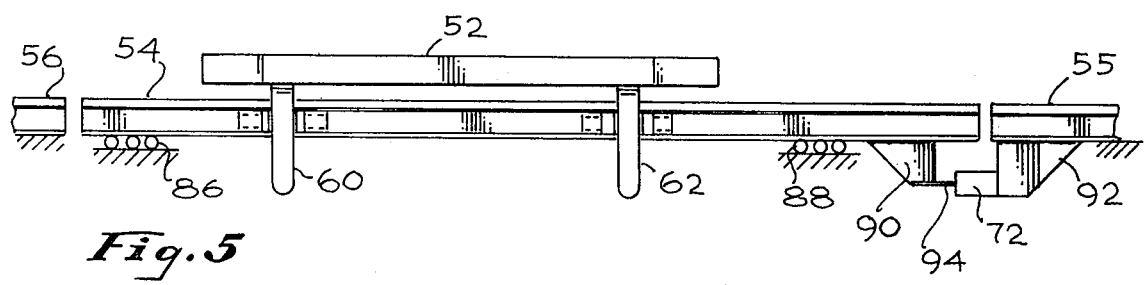
FIG. 5 is another arrangement of an embodiment of the invention which employs a load cell for measuring wheel friction.

FIG. 5 shows an alternative arrangement using a load cell for measuring the frictional or slippery state of the freight car wheel. Similar reference numerals are applied in FIG. 5 as in FIG. 3 to similar functioning apparatus. In FIG. 5, a section of the rail 54 to which the retarder is connected is severed from the main rail 55, 56. This severed section is mounted upon bearings 86, 88 so that some motion of the rail section 54 occurs when the retarder grips the rim of a freight car wheel passing therethrough. A wedge 90 is welded to one side of the rail section 54 and another wedge 92 is welded to the main rail section 55. The load cell is supported or attached to the wedge 92 and a coupling member 94 extends between the wedge section 90 and the sensitive end of the load cell 72. Accordingly, when the retarder is applied to a freight car wheel passing therethrough the tensile strain applied to the load cell will be a direct representative of the frictional state of the wheel.

Figure 6:
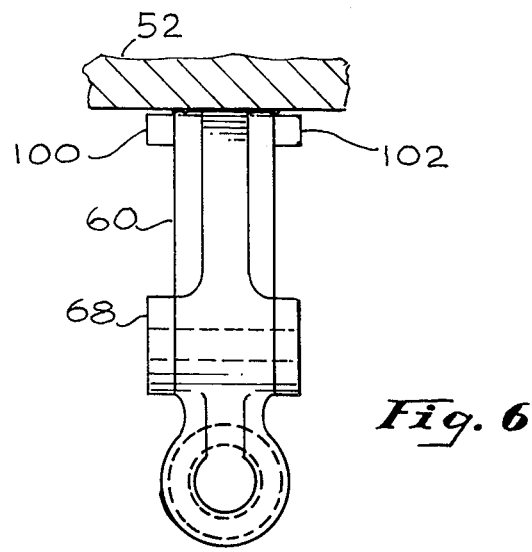
FIG. 6 is a partial drawing of one of the lever arms which are used to support the retarder shoes.

Still another transducer which may be used to determine the frictional state of a wheel is the strain gauge. The strain gauge can be used to measure the amount of a strain or the load applied to the retarder as the wheel of a car passes therethrough. FIG. 6 illustrates the placement of strain gauges on one of the levers of a retarder. These placements are to be considered as exemplary only and are not to be construed as a limitation upon this invention. Those skilled in the art know where the strain gauge may be placed to measure the load placed on a retarder when it engages the wheel of a freight car.

In FIG. 6, there is shown a portion of the lever 60, used to support the shoe 52. Two strain gauges respectively 100 and 102 are mounted on either side of the lever, just below the location at which it is attached to the shoe 52. Each gauge may be made part of a bridge circuit and the bridge circuit outputs may be added to provide a signal representative of the load applied to the retarder as a result of gripping a wheel of the freight car. This may be compared with a predetermined normal signal.

It should be understood that in order to get proper coverage a slippery wheel detector should be placed on each of the two rails of a track.

There has accordingly been described and shown a novel and useful "slippery wheel detector" for use in gravity type classification railways yards.

The embodiments of the invention in which an exclusive property or privilege is claimed are defined as follows:

1. A freight car slippery wheel indicator for indicating whether a retarder can adequately retard a freight car having wheels comprising
    retarder means for resiliently gripping a wheel of a freight car as it is rolled through said retarder means,
    transducer means attached to said retarder means for generating a load signal representative of the load applied to said retarder means as a result of friction between said retarder means and a freight car wheel which is grasped thereby and
    means responsive to said load signal for indicating whether said wheel is too slippery to be adequately retarded by a retarder.

2. A freight car slippery wheel indicator as recited in claim 1 wherein said means responsive to said signal for indicating whether said wheel is too slippery to be adequately retarded by a retarder comprises
    means for providing a reference signal representative of a marginally acceptable slippery wheel,
    means for comparing said reference signal with said load signal and providing an output signal when the load signal is less than said reference signal, and
    means responsive to said output signal for providing an indication thereof.

3. A freight car slippery wheel indicator as recited in claim 1 wherein said transducer means is a load cell.

4. A freight car slippery wheel indicator as recited in claim 1 wherein said transducer means comprise accelerometer means.

5. A freight car slippery wheel indicator as recited in claim 1 wherein said transducer means comprises strain gauge means.

6. A freight car slippery wheel indicator for indicating whether a retarder can adequately retard a freight car having wheels comprising
    retarder means for gripping the wheels of a freight car as it rolls through said retarder means, said retarder means including a pair of spaced shoes supported on a plurality of levers above a rail section, and being adapted to press against a freight car wheel passing therebetween with a predetermined pressure,
    load cell means for producing an output load signal representative of the load applied thereto,
    means for attaching said load cell means to one of said shoes for producing an output load signal representative of the load applied to said shoe when it is pressing against a freight car wheel; and
    means responsive to said output load signal for indicating whether said wheel is too slippery to be adequately retarded by a retarder.

7. A freight car slippery wheel indicator for indicating whether a retarder can adequately retard a freight car having wheels comprising
    retarder means for gripping the wheels of a freight car as it rolls through said retarder means, said retarder means including a pair of spaced shoes supported on a plurality of levers above a rail section, and being adapted to press against a freight car wheel passing therebetween with a predetermined pressure,
    accelerometer means attached to one of said shoes for producing an output signal representative of the acceleration applied to said shoe in response to said shoe pressing against a wheel of a freight car, and
    means responsive to said output signal for indicating whether said wheel is too slippery to be adequately retarded by a retarder.

8. A freight car slippery wheel indicator for indicating whether a retarder can adequately retard a freight car having wheels comprising
    retarder means for gripping the wheels of a freight car as it rolls through said retarder means, said retarder means including a pair of spaced shoes supported on a plurality of levers above a rail section, and being adapted to press against a freight car wheel passing therebetween with a predetermined pressure,
    strain gauge means attached to one of said plurality of levers for producing an output signal indicative of the strain being undergone when a freight car wheel is between said two shoes, and
    means responsive to said output signal for indicating whether said wheel is too slippery to be adequately retarded by a retarder.

9. A method of indicating whether a wheel of a freight car can be adequately retarded by a retarder having a pair of spaced shoes between which a freight car wheel passes, said shoes being resiliently biased toward one another with a predetermined pressure to apply pressure to said wheel as it passes therebetween, said method comprising
    generating a signal representative of the load applied to said retarder as a result of the friction between said retarder shoes and the wheel of a freight car passing therethrough, measuring said signal to determine whether or not it is representative of a predetermined acceptable load, and producing an output when said signal is indicative of a non-acceptable load.

10. A method as recited in claim 9 wherein said step of generating a signal representative of the load applied to said retarder includes attaching a load cell between one of said retarder shoes and the rail on which the wheel being tested rolls, and deriving an output signal from said load cell while a wheel is being retarded by said spaced shoes.

11. A method as recited in claim 9 wherein said step of generating a signal representative of the load applied to said retarder includes attaching an accelerometer to one of said retarder shoes, and deriving an output signal from said accelerometer while a wheel is being retarded by said retarder.

12. A method as recited in claim 9 wherein said step of generating a signal representative of the load applied to said retarder includes attaching a strain gauge to one of said retarder shoes, and deriving an output signal from said strain gauge while a wheel is being retarded by said retarder.

* * * * *